June 18, 1935.  L. DELLERT  2,004,934
CHAIR
Filed Nov. 13, 1933   4 Sheets-Sheet 1

WITNESSES

INVENTOR
Louis Dellert

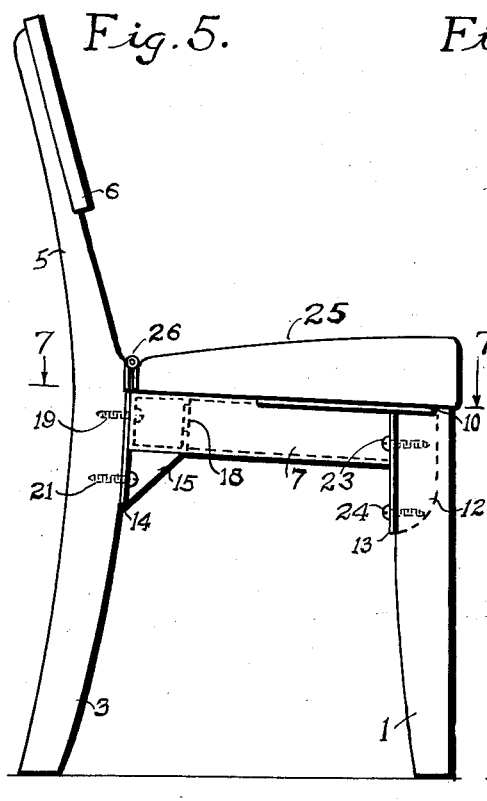
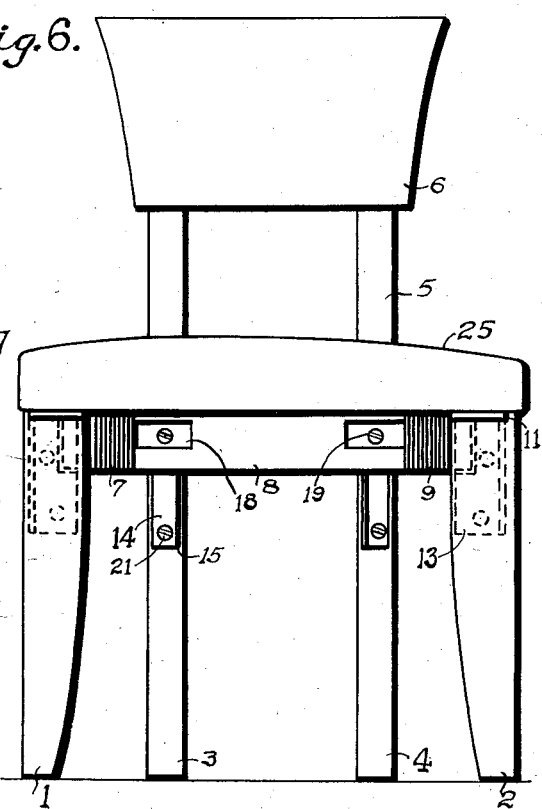
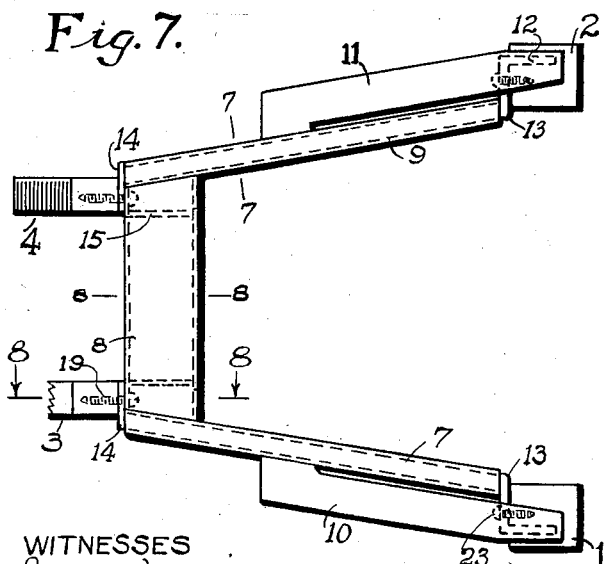
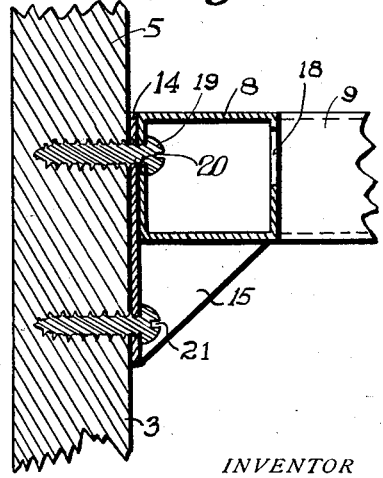

June 18, 1935.   L. DELLERT   2,004,934
CHAIR
Filed Nov. 13, 1933   4 Sheets-Sheet 3

WITNESSES
Joseph Mooney
Charlotte H. Aupperle

INVENTOR
Louis Dellert

June 18, 1935.  L. DELLERT  2,004,934
CHAIR
Filed Nov. 13, 1933   4 Sheets-Sheet 4
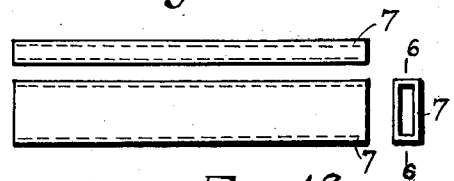
Fig. 17.
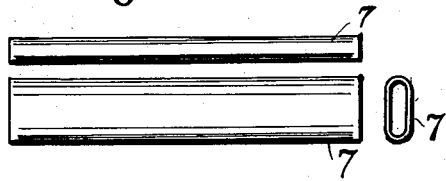
Fig. 25.
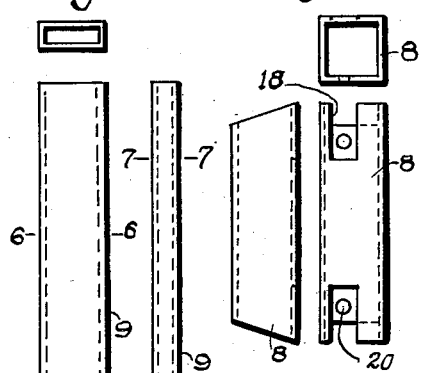
Fig. 20. Fig. 18.
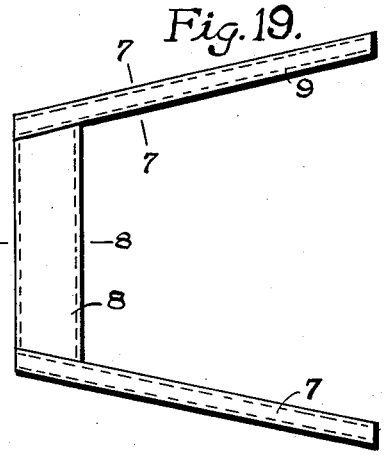
Fig. 19.
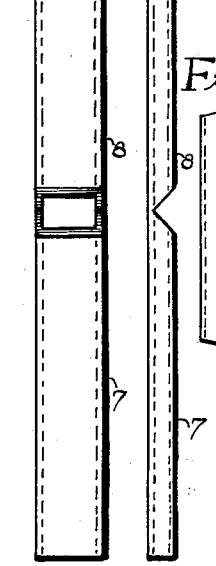
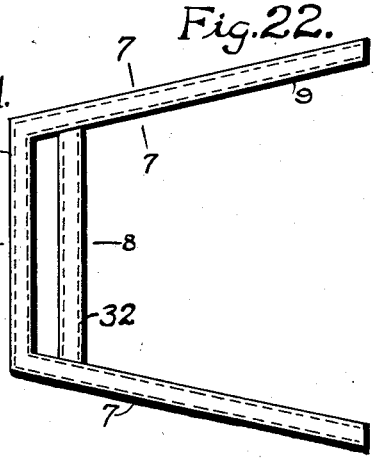
Fig. 21. Fig. 22.
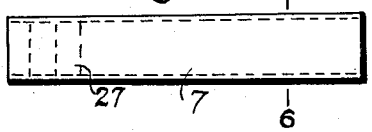
Fig. 23.
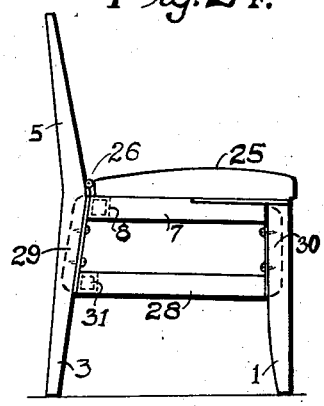
Fig. 24.
WITNESSES
Joseph Manning
Charlotte H. Cuppers
INVENTOR
Louis Dellert Patented June 18, 1935

2,004,934

UNITED STATES PATENT OFFICE 2,004,934

CHAIR

Louis Dellert, Brooklyn, N. Y.

Application November 13, 1933, Serial No. 697,731

3 Claims. (Cl. 155—2)

This invention relates to furniture and particularly to an improved chair which is so formed as to be nested from the front or from the rear in a minimum space without the legs leaving the floor.

Another object of the invention is to provide a strong artistic chair so formed as to permit a plurality of identical chairs to be nested upon moving the seat to a position exposing the seat frame of the chair.

An additional object, is to provide a chair formed so that a plurality of identical chairs may be nested the structure including a rigid substantially U shaped frame which holds the front and rear legs in proper place, the construction being such that the seat sections are swung to a substantially vertical position when two or more chairs are in a nested relationship and to a horizontal position when the chair is in use.

In the accompanying drawings—

Figure 5 is a view similar to Figure 1 but showing a modified form of assembled chair.

Figure 6 is a front view of the chair shown in Figure 5.

Figure 7 is a sectional view through Figure 5 on line 7—7.

Figure 8 is a detailed fragmentary sectional view of Figure 7 on line 8—8.

Figure 17 is a detailed plan elevation and end views of lateral portion of chair frame shown in Figure 19.

Figure 18 is a detailed plan elevation and end views of transverse portion of chair frame shown in Figure 19.

Figure 19 is a detailed elevation of U shaped chair frame showing transverse portion as shown in Figure 18 connected to two lateral portions one of which is shown in Figure 17.

Figure 20 is a view similar to Figures 17 and 18 but a modified form showing transverse and lateral portions made from one piece and bent to form a chair frame as shown in Figure 22.

Figure 21 is a detailed plan elevation of transverse member to reinforce chair frame shown in Figure 22.

Figure 22 is a plan view of a modified form of U shaped chair frame.

Figure 23 is an elevation of chair frame shown in Figure 22.

Figure 24 is an elevation view of a modified form of chair showing U shaped chair frame and a similar U shaped rung frame to add additional strength to chair if required.

Figure 25 is a detailed plan elevation and end view of a modified lateral portion of U shaped frame.

Referring to the accompanying drawings by numerals, 1 and 2 indicate the front legs of the chair, 3 and 4 indicate the rear legs. Legs 3 and 4 extend upwardly and merge into the back 5 which, if desired, may have a panel or other structure 6.

Figure 1:
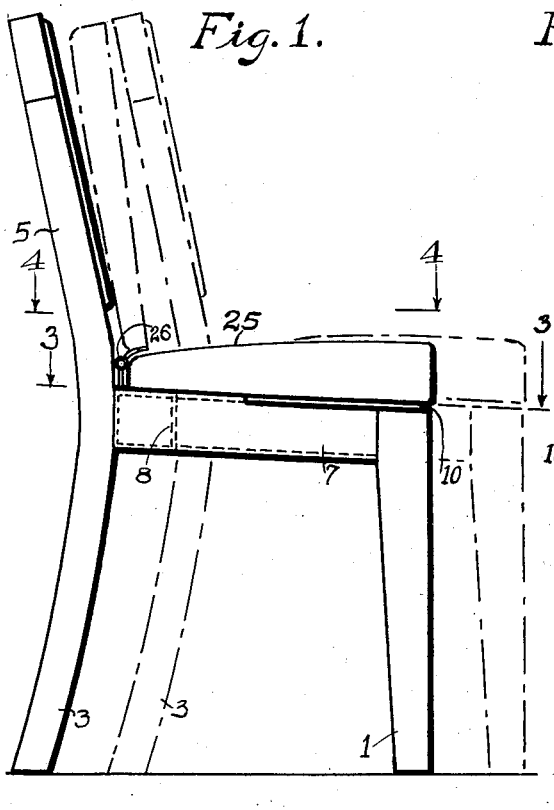
Figure 1 is a side view of a chair disclosing an embodiment of the invention, second chair being shown nested therewith, the same being illustrated by dotted lines.
Figure 2:
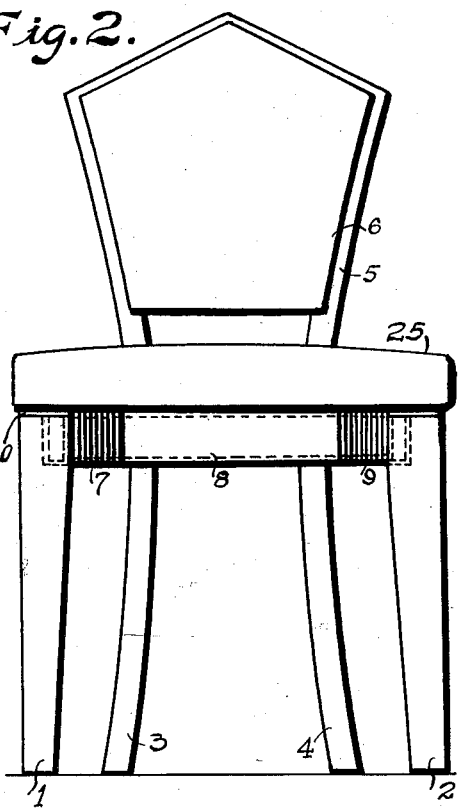
Figure 2 is a front elevation of a chair disclosing an embodiment of the invention.
Figure 3:
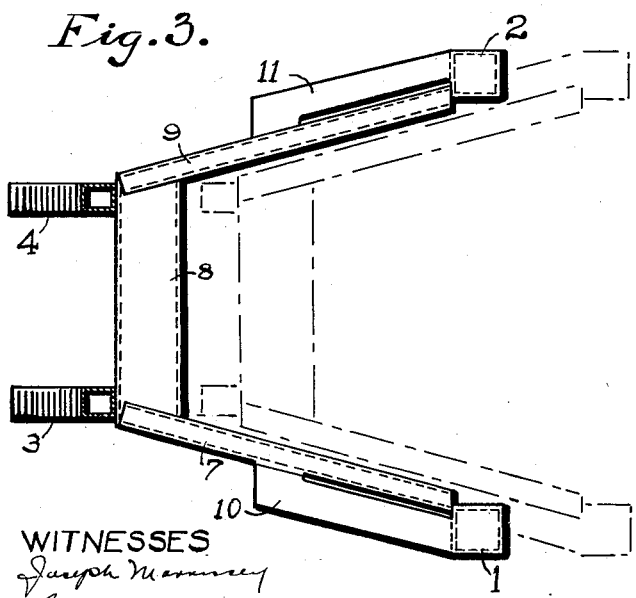
Figure 3 is a sectional view through Figure 1 on line 3—3, the seat being removed.
Figure 4:
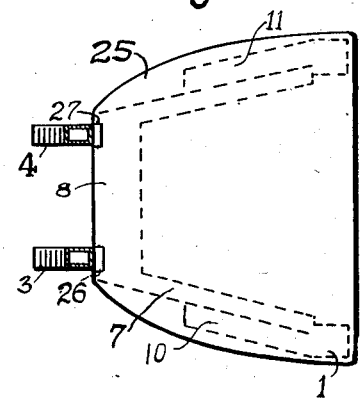
Figure 4 is a horizontal sectional view through Figure 1 on line 4—4.

Figures 1, 2 and 3 show a chair having metal tubular legs and back rigidly welded to a metal tubular U shaped seat frame open at the front of said chair, said U shaped frame includes a tubular transverse portion 8 welded to two tubular lateral portions 7 and 9.

A seat 25 rests on seat frame 7, 8 and 9 and is connected by hinges 26 and 27 to back 5. It is to be noted that lateral portions of seat 25 extend out beyond said seat frame, and if a person occupying said chair desired to move it forward by lifting chair without just lifting seat 25 it would be awkward to reach under to get hold of said seat frame therefore there are two flat metal outwardly extending hand grip plates 10 and 11 the rear portions are welded to the upper and outer border of seat frame, the forward portions of said hand grip plates are welded to the tops of the tubular legs 1 and 2, in Figures 1, 2 and 3. Said hand grip plates 10 and 11 are welded at their forward portions to top of angular plates 12 and 13 shown in Figures 5, 6, 7, 10, 13, 14 and 15.

Figures 5, 6 and 7 show invention in modified form of assembled chair and includes a seat frame 7, 8 and 9 having metal angular plates 12 and 13 welded to front end of said frame, the forward flange 12 of said angle plate sets snugly in a recess in upper rear portion of front wood legs 1 and 2 and made secure with screws 23 and 24. The rear end of said frame has attached by welding a metal reinforcing plate 14, the lower portion of plate 14 has a forward extending flange 15 welded to under side of transverse tube 8, said transverse tube 8 having opening 18 shown in Figure 8 and hole 20 to allow threaded portion of screw 19 to pass through and screw into back 5, plate 14 includes a hole for screw 21, to help hold secure back 5. It is to be understood that any type or style of legs or backs of wood or other suitable material can be readily attached to said seat frame with suitable screw or bolts.

Figure 9:
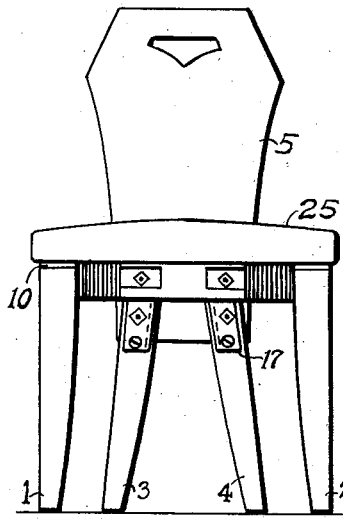
Figure 9 is a view similar to Figures 1 and 5 but showing another modified form of assembled chair.
Figure 10:
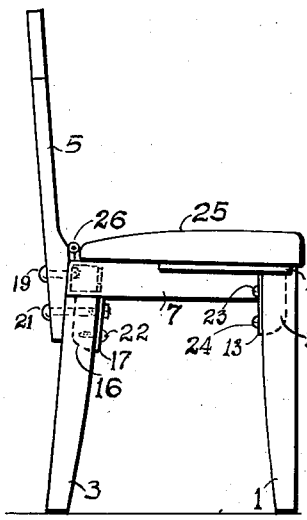
Figure 10 is a side view of chair shown in Figure 9.
Figure 11:
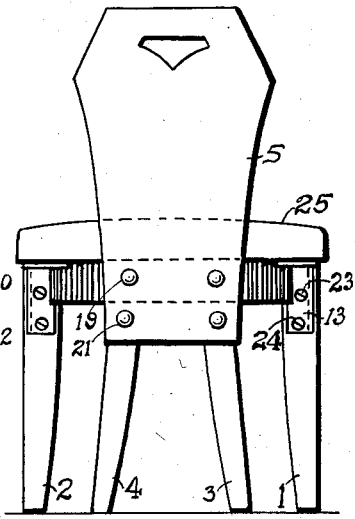
Figure 11 is a rear view of chair shown in Figure 9.
Figure 12:
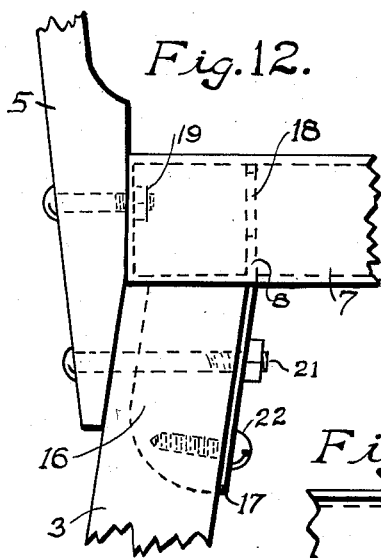
Figure 12 is an enlarged fragmentary view of Figure 10 showing detailed assembly of back and rear legs to chair frame.

Figures 9, 10 and 11 show invention in a more modified form of assembled chair generally known Tavern type, in this type of chair the front legs could be of metal tubing and welded to seat frame similar to chair as shown in Figures 1, 2 and 3 or the front legs could be of wood and fastened the same as shown in Figures 5, 6, 7, 13 and 14. The rear legs of this type of chair are secured under the seat frame, and if the rear legs are of metal tubing they can be welded to the under side of transverse member 8 and if rear legs of wood are desired suitable means are provided as shown in Figures 9, 10 and 12, an angular plate 17 with its rearwardly extending flange 16 is welded at its upper end to bottom of transverse member 8 the lateral extending flange 17 is provided with holes for suitable screws or bolts 21 and 22 the rearwardly extending flange 16 snugly fits into a recess in the forward and upper portion of rear legs 3. It is to be noted that the back at its lower end is bolted or screwed to transverse member 8 by a screw or bolt 19 and by a screw or bolt 21 which passes through lower end of back 5, through upper end of rear leg 3 and extending through plate 17 and held secure with nut on bolt 21. Various styles of backs and legs can be easily secured to a seat frame embodying this invention and various plates or angle plates can be used with suitable types of screws or bolts without departing from the nesting features of the invention.

Figure 13:
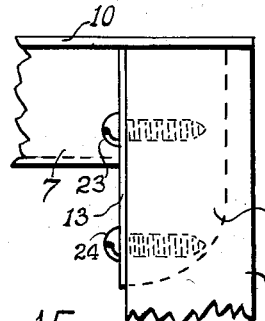
Figure 13 is an enlarged fragmentary view of Figure 10 showing detailed assembly of chair frame and front leg.

Figure 13 is an enlarged fragmentary view showing detailed assembly of chair frame and front leg of chairs as shown in Figures 5, 6, 7, 9, 10 and 11.

Figure 14:
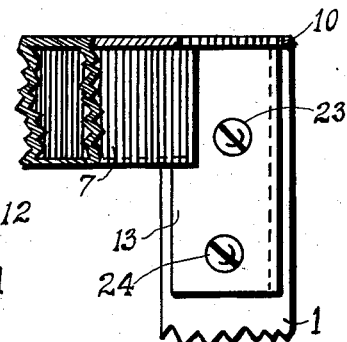
Figure 14 is a rear view of Figure 13.
Figure 15:
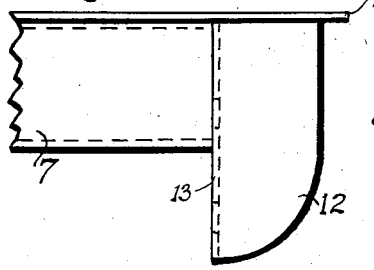
Figure 15 is the same as Figure 13 the front leg being removed.
Figure 16:
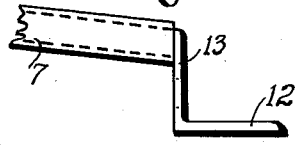
Figure 16 is a horizontal view of Figure 15 the hand grip plate being removed.

Figure 14 is a rear view of Figure 13.

Figure 19 shows a U shaped frame embodying the invention constructed of metal tubing the lateral portions 7 and 9 securely welded to connecting transverse portion 8 while the lateral portions may be preferably rectangular as shown by top, side and end views in Figure 17 the lateral portions may have rounded tops and bottoms as shown in top, side and end view Figure 25, or may be substantially oval or elongated in section, the narrow side of lateral portions to be used as top or bottom and wider portion to be side of said U shaped frame shown in Figures 19 and 22.

Figure 22 shows a modified form of U shaped chair frame constructed of one long piece of tubing having two U shaped pieces cut out of side so as to be easily bent into a U shape side top and end view shown in Figure 20, numerals 7 and 9 acting as lateral portions and portion 8 being transverse portion, but to sufficiently stiffen this type of U shaped frame a reinforcing member 32 is used shown in Figure 21 and shown welded in position in Figure 22.

Figure 23 is a side view of Figure 22. In reference to Figures 19 and 22 showing U shaped chair frames embodied in the invention it is to be noted that the depth on line 6—6 of each lateral portion is greater than the width on line 7—7 of each lateral portion. It is to be further noted that the width of the transverse portion on line 8—8 is greater than the width of each lateral portion on line 7—7.

Figure 24 is a side view of a chair embodied in the invention having two U shaped structures similar to the two shown in Figures 19 and 22, but in Figure 24 the upper U shaped structure acts as a U shaped seat frame and the lower U shaped frame acts as a U shaped rung frame, said two U shaped frames are open at the front, and said U shaped frames may be connected together by welding with metal upright members 29 and 30 to which front and rear legs 1 and 3 may be attached, similar to other assembled nested chairs, wherein a metal U shaped frame is used having a back and legs of wood or any other suitable material. It is to be understood in this invention that the tubing or any metal parts of these chairs may be made of steel, aluminum or any other suitable metals and metal parts may be secured together by brazing, acetylene welding, or any suitable electric method. In Figure 24 number 7 shows lateral portion of U shaped seat frame and number 28 shows lateral portion of rung frame number 31 is transverse member of connected to lateral member 28.

Obviously numerous changes and alterations might be made in the general form and arrangement of parts described without departing from the invention. Therefore I do not wish to limit myself to the details set forth, but shall consider myself at liberty to make such changes and alterations as fairly come within the scope of the appended claims.

I claim:

1. A nestable chair having a tubular U shaped seat frame open at the front consisting of two tubular side members and a connecting transverse member, a pair of front legs attached at their upper ends to the front ends of said side members, the greater portions of said front legs extending laterally from said side members to permit the nesting of a plurality of identical chairs, a seat hingedly secured above said seat frame, said seat extending out laterally beyond said tubular side members to the lateral border of said front legs, and hand-grip plates extending laterally from said side members to the lateral edges of said seat and from the front ends of said side members rearwardly about half-way the length of said side members.

2. A nestable chair including a substantially U shaped seat frame open at the front, a pair of rear legs attached to said seat frame, a pair of front legs spaced further apart than said rear legs and attached to said U shaped frame, and a seat resting on said seat frame and mounted movably to permit the packing of two or more chairs in a nested relationship, said U shaped frame consisting of two downwardly extending tubular side members that converge towards the rear and are securely attached to a connecting transverse member, said transverse member having a width approximately equal to the combined width of both of said downwardly extending tubular side members, the wider transverse member rigidly holding and preventing weave or wobble in said tubular side members and said front legs, and the said transverse member occupying a minor portion at the rear end of the space between said side members, leaving the central and forward area open and unobstructed, providing ample space for the nesting therein of the rear portions of two or more chairs of identical size and shape, without raising the legs of said chairs from the floor during the nesting operation.

3. A nestable chair including a substantially U shaped brace open at the front, a pair of front legs and a pair of rear legs attached to said U shaped brace, and a seat resting above said U shaped brace and movably mounted to permit the nesting operation, said U shaped brace consisting of two downwardly extending tubular side members rigidly attached at the rear to a connecting transverse member, said downwardly extending tubular side members having a greater depth than width, the twist resisting characteristic of tubular construction providing ample rigidity in said side members and preventing lateral wabble in said front legs, and the said transverse member occupying a minor portion at the rear of the area between said side members leaving the central and forward portions open providing ample space for the nesting therein of the major portion of another chair, without raising the legs of said chair off the floor when placing the same in nested relationship.

LOUIS DELLERT.